US009708483B2

(12) United States Patent
Niessner et al.

(10) Patent No.: US 9,708,483 B2
(45) Date of Patent: *Jul. 18, 2017

(54) THERMOPLASTIC MOULDING MATERIALS BASED ON ACRYLONITRILE, STYRENE AND BUTADIENE

(71) Applicant: INEOS STYROLUTION GROUP GMBH, Frankfurt am Main (DE)

(72) Inventors: Norbert Niessner, Friedelsheim (DE); SangJun Ahn, Songpa-gu (KR); Roland Walker, Ludwigshafen (DE); Michel Pepers, DB Velden (NL); Brian J. Banaszak, Mannheim (DE); Johannes Barth, Ludwigshafen (DE); Gisbert Michels, Leverkusen (DE); Florian Patcas, Ludwigshafen (DE); YoungHwa Hwang, Ulsan (KR); Rudy Verstraeten, Beerse (BE)

(73) Assignee: INEOS STYROLUTION GROUP GMBH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/784,655

(22) PCT Filed: Apr. 16, 2014

(86) PCT No.: PCT/EP2014/057824
§ 371 (c)(1),
(2) Date: Oct. 15, 2015

(87) PCT Pub. No.: WO2014/170407
PCT Pub. Date: Oct. 23, 2014

(65) Prior Publication Data
US 2016/0083572 A1    Mar. 24, 2016

(30) Foreign Application Priority Data

Apr. 18, 2013 (EP) .................... 13164273

(51) Int. Cl.
| | | |
|---|---|---|
| C08L 25/12 | (2006.01) | |
| C08F 279/04 | (2006.01) | |
| C08L 55/02 | (2006.01) | |
| C08L 51/04 | (2006.01) | |
| C08F 265/04 | (2006.01) | |
| C08F 279/02 | (2006.01) | |
| C08F 285/00 | (2006.01) | |
| C08F 2/26 | (2006.01) | |

(52) U.S. Cl.
CPC .............. *C08L 25/12* (2013.01); *C08F 2/26* (2013.01); *C08F 265/04* (2013.01); *C08F 279/02* (2013.01); *C08F 279/04* (2013.01); *C08F 285/00* (2013.01); *C08L 55/02* (2013.01); *C08L 2207/04* (2013.01)

(58) Field of Classification Search
None
See application file for complete search history.

(56) References Cited

U.S. PATENT DOCUMENTS

| | | |
|---|---|---|
| 3,692,744 A | 9/1972 | Rich et al. |
| 4,421,875 A | 12/1983 | McKee et al. |
| 5,373,060 A | 12/1994 | Guentherberg et al. |
| 6,525,172 B1 | 2/2003 | Barghoorn et al. |
| 6,812,283 B2 | 11/2004 | Duijzings et al. |
| 2016/0075813 A1* | 3/2016 | Niessner .................. C08F 2/26 525/78 |
| 2016/0340504 A1* | 11/2016 | Niessner ................. C08L 25/12 |

FOREIGN PATENT DOCUMENTS

| | | |
|---|---|---|
| CA | 1056975 A | 6/1979 |
| DE | 1900270 A1 | 11/1969 |
| DE | 2427960 B1 | 6/1975 |
| DE | 19752394 A1 | 5/1999 |
| DE | 19907136 A1 | 8/2000 |
| DE | 102005022632 A1 | 11/2006 |
| DE | 102005022635 A1 | 11/2006 |
| EP | 0022200 A1 | 1/1981 |

(Continued)

OTHER PUBLICATIONS

Mckee, electronic translation of DE 102005022632, Nov. 2006.*
English translation of the International Preliminary Report on Patentability in International Application No. PCT/EP2014/057824, dated Oct. 22, 2015.
English translation of the International Search Report in International Application No. PCT/EP2014/057824, dated Jul. 7, 2014.
English Abstract of DE 19752394 from Espacenet (DE 19752394 publication date May 20, 1999).
English Abstract of DE 102005022632 from Espacenet (DE 102005022632 publication date Nov. 16, 2006).
English Abstract of DE 102005022635 from Espacenet (DE 102005022635 publication date Nov. 16, 2006).

(Continued)

*Primary Examiner* — Jeffrey Mullis
(74) *Attorney, Agent, or Firm* — J.A. Lindeman & Co., PLLC

(57) ABSTRACT

The invention relates to thermoplastic moulding materials based on acrylonitrile-butadiene-styrene, comprising a SAN-polymer matrix and a graft copolymer, structured from an agglomerated butadiene rubber-graft base and a SAN-graft envelope. The agglomerated graft base has a bimodal particle size distribution of a fraction x) of non-agglomerated particles having a d50-value in the range from 80 to 120 nm and a fraction y) of agglomerated particles having a $d_{50}$-value in the range from 350 to 550 nm and a polydispersity U of less than 0.28. The invention further relates to a method for producing the graft copolymer, wherein an acrylate copolymer having a polydispersity U of less than 0.27 and a d50-value of 100 to 150 nm is used for agglomeration. The invention further relates to the use of thermoplastic moulding materials for producing moulded parts.

10 Claims, No Drawings

(56) References Cited

FOREIGN PATENT DOCUMENTS

| EP | 0062901 A2 | 10/1982 |
|----|------------|---------|
| EP | 0077038 A2 | 4/1983 |
| EP | 0579140 A2 | 1/1994 |
| EP | 1305345 B1 | 5/2003 |
| WO | 2008/020012 A2 | 2/2008 |

OTHER PUBLICATIONS

English Abstract of EP 0022200 from Espacenet (EP 0022200 publication date Jan. 14, 1981).
English Abstract of WO 20081020012 from Espacenet (WO 2008/020012 publication date Feb. 21, 2008).

* cited by examiner

THERMOPLASTIC MOULDING MATERIALS BASED ON ACRYLONITRILE, STYRENE AND BUTADIENE

The invention relates to thermoplastic molding compounds based on acrylonitrile-butadiene-styrene (ABS) having improved mechanical and optical properties, to graft copolymers comprised therein and a process for the production of said graft copolymers and to the use of said molding compounds.

Producing thermoplastic molding compounds by modifying styrene-acrylonitrile copolymers through the incorporation of rubbers has been known for decades. This is achieved, for example, by graft copolymerization of styrene and acrylonitrile in the presence of a rubber and by subsequent blending of this graft copolymer with a separately produced polymeric matrix which may be composed, for example, of a styrene-acrylonitrile copolymer or of a methylstyrene-acrylonitrile copolymer.

EP-A 0 022 200 discloses producing thermoplastic molding compounds comprising a copolymer matrix composed of styrene and acrylonitrile and a graft copolymer composed of a rubber latex, styrene and acrylonitrile. This comprises initially producing a polybutadiene latex by radical polymerization using potassium peroxodisulfate as initiator. This rubber latex is then subjected to an agglomeration which serves to increase the size of the rubber particles. This agglomeration may, for example, be effected by reaction of the rubber latex with an emulsion of a copolymer of ethyl acrylate and methacrylamide. The graft rubber is then produced by reaction of the agglomerated rubber latex with styrene and acrylonitrile using an initiator.

It is further known to those skilled in the art that the size of the rubber particles has a substantial impact on the physical properties of the thermoplastic molding compounds. For production convenience it may be advantageous to initially produce a rubber latex having a small particle size of the rubber particles and to increase the particle size of the rubber particles by an agglomeration process in a subsequent step. However, one difficulty with the agglomeration step is that the dispersion formed often comprises not only the desired agglomeration products but also nonagglomerated particles and a coagulate which may comprise very large particles.

This coagulate can have a negative effect on the mechanical properties of the thermoplastic molding compounds. Removing the coagulate can result in a marked loss of material. The intention is moreover to achieve the highest possible yield of particles having the desired particle size which is of particular importance in particular for large industrial scale plants.

EP-A 0 077 038 describes the agglomeration of a dispersed rubber in the presence of a dispersion of an acid group-comprising latex and in the presence of a neutral electrolyte. Since the agglomeration latex comprises free acid groups, the agglomeration must be performed at a nonacidic pH. This process has the disadvantage that the effectiveness of the agglomeration is strongly affected by variations in pH and the pH must therefore be very precisely maintained to obtain reproducible results.

From EP-A 1 305 345 those skilled in the art are familiar with a further process for agglomerating a butadiene rubber where the agglomeration is carried out in the presence of a basic electrolyte, for example in the presence of potassium hydroxide.

WO 2008/020012 describes a butadiene rubber latex which is agglomerated using an acrylic ester polymer, in particular a copolymer of ethyl acrylate and methylacrylamide. Said document further describes graft copolymers produced therefrom, grafted with styrene and acrylonitrile (SAN), and thermoplastic molding compounds having improved impact strength and comprising such a graft copolymer and poly(styrene-co-acrylonitrile) (PSAN) as the matrix polymer. The agglomerated graft substrate can have a bimodal particle size distribution with $d_{50}$ values of from 80 to 120 nm and 350 to 550 nm. The polydispersity U of the particles is not addressed.

DE 10 2005 022 632 A1 describes a particulate agglolatex, a polybutadiene rubber dispersion agglomerated therewith and a corresponding SAN graft rubber, and also a thermoplastic molding compound composed of PSAN comprising the graft rubber. The agglolatex employed is preferably a copolymer of ethyl acrylate and methacrylamide. It is particularly preferable when the agglolatex has a nonuniformity U of ≤0.35 and a $d_{50}$ value of from 65 to 150 nm. Said document further describes particulate rubbers which are produced using the agglolatex and have a bimodal particle size distribution comprising nonagglomerated particles and a fraction of agglomerated particles. The fraction of agglomerated particles very particularly preferably has a nonuniformity U of ≤0.7 and particularly preferably has a $d_{50}$ value of >400 nm.

Document DE 10 2005 022 635 A1 describes an agglolatex, in particular a copolymer of ethyl acrylate and methacrylamide having a nonuniformity U of ≤0.35 and a $d_{50}$ value of from 80 to 190 nm. An emulsion rubber agglomerated therewith comprises at least a fraction of agglomerated particles having a nonuniformity U of <0.35, particularly preferably <0.30, and a $d_{50}$ value of >300 nm, preferably >400 nm. Said document further describes a polybutadiene rubber having a SAN graft superstrate and comprising an agglomerated rubber fraction having a nonuniformity of 0.33 and a $d_{50}$ value of 630, and also describes a thermoplastic molding compound composed of PSAN and comprising said rubber.

The mechanical properties such as the Charpy notched impact strength and also the surface gloss of molding compounds produced in accordance with the prior art cited hereinabove and comprising styrene-acrylonitrile copolymers are still in need of improvement.

It is an object of the present invention to provide thermoplastic ABS molding compounds which have improved impact strength and improved surface gloss and which may be produced by a process that is simple to carry out on an industrial scale.

The invention provides a graft copolymer B constructed from:
 B1: 40 to 85 wt %, based on the solids content of the graft copolymer B, of a graft substrate (B1) obtainable by (a) polymerizing:
  (B11): 0 to 10 wt %, based on the graft substrate B1, of at least one vinylaromatic, in particular styrene, and
  (B12): 90 to 100 wt %, based on the graft substrate B1, of at least one diene, in particular butadiene,
 where (B11) and (B12) sum to 100 wt %;
 and (b) agglomerating the obtained graft substrate B1 by adding (C): 0.01 to 5 parts by weight, based on 100 parts by weight of the graft substrate B1, in each case based on the solids content, of an agglomerating copolymer (C) of:
  (C1): 80 to 99.9 wt % of one or more hydrophobic $C_1$ to $C_{12}$ alkyl acrylates or $C_1$ to $C_{12}$ alkyl methacrylates and (C2): 0.1 to 20 wt % of one or more hydrophilic comonomers selected from the group consisting of acrylamide, methylacrylamide, ethylacrylamide and n-butylacrylamide,
where (C1) and (C2) sum to 100 wt %; and B2: 15 to 60 wt %, based on the solids content of the graft copolymer B, of a graft sheath obtainable by reacting the agglomerated graft substrate B1 with a mixture of:
(B21) 70 to 90 wt %, based on the graft sheath (B2), of styrene and/or α-methylstyrene, in particular styrene, and
(B22) 10 to 30 wt %, based on the graft sheath (B2), of acrylonitrile and/or methyl methacrylate, in particular acrylonitrile,
where the graft substrate B1 and the graft sheath B2 sum to 100 wt % in total;
characterized in that
(i) the agglomerating copolymer (C) has a polydispersity U of less than 0.27 and a $d_{50}$ value of from 100 to 150 nm and
(ii) the agglomerated graft substrate B1 has a bimodal particle size distribution of a fraction x) of nonagglomerated particles having a $d_{50}$ value in the range of from 80 to 120 nm and a fraction y) of agglomerated particles having a $d_{50}$ value in the range of from 350 to 550 nm and a polydispersity U of less than 0.28.

This particle diameter $d_{50}$, also known as the $d_{50}$ value of the integral mass distribution, is defined as the value at which 50 wt % of the particles have a diameter smaller than the $d_{50}$ value and 50 wt % of the particles have a diameter larger than the $d_{50}$ value.

In the present application the weight-average particle diameter $d_w$ is determined with a disk centrifuge (e.g.: CPS Instruments Inc. DC 24000 with a disk rotational speed of 24 000 rpm). The weight-average particle diameter $d_w$ is defined by the following formula (see G. Lagaly, O. Schulz and R. Ziemehl, Dispersionen and Emulsionen: eine Einführung in die Kolloidik feinverteilter Stoffe einschließlich der Tonminerale, Darmstadt: Steinkopf-Verlag 1997, ISBN 3-7985-1087-3, page 282, formula 8.3b):

$$d_w = \text{sum}(n_i * d_i^4)/\text{sum}(n_i * d_i^3)$$

$n_i$: number of particles of diameter $d_i$

In the context of the present application the nonuniformity U is a measure of the width of the particle size distribution in a particulate (co)polymer/a fraction of a particulate (co)polymer. In the context of the present application the nonuniformity is defined as $U=(d_{90}-d_{10})/d_{50}$. The smaller the U value, the narrower the distribution.

Graft Substrate (B1)

The diene component (B12) employed may be for example isoprene and/or butadiene, preferably butadiene.

The component (B11) employed may be alpha-methylstyrene and/or styrene, preferably only styrene.

The graft substrate B1 generally employs the diene component (B12) in an amount of from 90 to 100 wt %, preferably 90 to 98 wt %, and the vinylaromatic component (B11) in an amount of from 0 to 10 wt %, preferably 2 to 10 wt %.

Preference is given to a graft substrate B1 composed of butadiene and styrene in the abovementioned composition.

The graft substrate (B1) is produced by polymerizing the components (B12) and optionally (B11) in aqueous emulsion according to processes known to those skilled in the art generally at temperatures of 20° C. to 100° C., preferably 50° C. to 90° C. The polymerization may employ the customary emulsifiers such as alkali metal salts of alkyl- or arylsulfonic acids, alkyl sulfates, fatty alcohol sulfonates, salts of higher fatty acids comprising 10 to 30 carbon atoms or resin soaps. It is preferable to employ the sodium or potassium salts of alkylsulfonates or fatty acids comprising 10 to 18 carbon atoms. The emulsifiers are favorably employed in an amount of from 0.5 to 5 wt %, preferably from 0.5 to 2 wt %, based on the total weight of the monomers used for the graft substrate (B1). A water/monomer ratio of from 2:1 to 0.7:1 is generally employed.

Polymerization initiators employed are in particular the commonly used persulfates such as potassium peroxodisulfate though redox systems are also suitable. The amounts of initiators, for example 0.1 to 1 wt %, based on the total weight of the monomers used for producing the graft substrate (B1), depends on the molar weight desired.

Polymerization assistants that may be employed include the customary buffer substances used to adjust the pH to the preferred range of from 6 to 10, for example sodium bicarbonate and sodium pyrophosphate, and also generally 0.1 to 3 wt % of a molecular weight regulator such as mercaptan, terpinol or dimeric α-methylstyrene.

The precise polymerization conditions, in particular type, feed modus and amount of the emulsifier are selected within the abovementioned ranges such that the graft substrate (B1) has a $d_{50}$ value as defined hereinbelow, as is described, for example, in DE-A-2427960.

The graft substrate B1 generally has a $d_{50}$ value in the range of from 80 to 120 nm, particularly preferably 80 to 110 nm.

The polydispersity U of the graft substrate B1 is preferably less than 0.35, in particular less than 0.33.

Preference is given to a graft substrate having a $d_{50}$ value in the range of from 80 to 120 nm and a polydispersity U of less than 0.35, in particular less than 0.33.

As already mentioned hereinabove, in the present application the determination of the weight-average particle diameter $d_w$ is carried out using a disk centrifuge (e.g. CPS Instruments Inc. DC 24000 with a disk rotational speed of 24 000 rpm). The weight-average average particle diameter $d_w$ is defined according to the following formula (see G. Lagaly, O. Schulz and R. Ziemehl, Dispersionen and Emulsionen: eine Einführung in die Kolloidik feinverteilter Stoffe einschließlich der Tonminerale, Darmstadt: Steinkopf-Verlag 1997, ISBN 3-7985-1087-3, page 282, formula 8.3b):

$$d_w = \text{sum}(n_i * d_i^4)/\text{sum}(n_i * d_i^3)$$

$n_i$: number of particles of diameter $d_i$

The summation is performed from the smallest to the largest diameter of the particle size distribution. It should be noted that for a particle size distribution of particles having the same density the volume-average particle diameter $d_v$ is equal to the weight-average particle diameter $d_w$.

The average particle diameter, also referred to as the $d_{50}$ value of the integral mass distribution, is defined as the value at which 50 wt % of the particles have a diameter smaller than the $d_{50}$ value and 50 wt % of the particles have a diameter larger than the $d_{50}$ value.

$d_{10}$ and $d_{90}$ values are defined as follows: $d_{10}$ is the diameter at which 10 wt % of the particles are smaller than this value and $d_{90}$ is the diameter at which 90 wt % of the particles are smaller than this value.

In the context of the present application the nonuniformity or polydispersity U is a measure of the width of the particle size distribution in a particulate (co)polymer/a fraction of a particulate (co)polymer. In the context of the present application the polydispersity U is defined as $U=(d_{90}-d_{10})/d_{50}$. The smaller the U value, the narrower the distribution.

Agglomerating Component (C)

Agglomeration of the graft substrate (B1) is achieved by employing an agglomerating component (C), a copolymer of (C1) one or more hydrophobic $C_1$ to $C_{12}$ alkyl acrylates or $C_1$ to $C_{12}$ alkyl methacrylates and (C2) one or more hydrophilic comonomers selected from the group consisting of acrylamide, methylacrylamide, ethylacrylamide and n-butylacrylamide. In accordance with the invention the agglomerating component (C) has a polydispersity U of less than 0.27 and a $d_{50}$ value of from 100 to 150 nm.

The composition of the copolymer (C) is generally as follows:
(C1) 80 to 99.9, preferably 90 to 99.9 wt % of the component (C1) and
(C2) 0.1 to 20, preferably 0.1 to 10 wt % of the component (C2),
where the sum of monomers (C1) and (C2) is precisely 100 wt %.

The monomers (C1) employed are preferably C1-C4 alkyl acrylates or else mixtures thereof. The monomer (C1) is preferably ethyl acrylate.

The monomer (C2) is preferably methacrylamide.

Preference is given to a copolymer (C) of ethyl acrylate and methacrylamide.

Particular preference is given to a copolymer (C) of 92 to 98 wt %, based on the total solids in (C), of ethyl acrylate and 2 to 8 wt %, based on the total solids in (C), of methacrylamide.

Very particular preference is given to a copolymer (C) of 93 to 97 wt %, based on the total solids in (C), of ethyl acrylate and 3 to 7 wt %, based on the total solids in (C), of methacrylamide.

Preference is given to copolymers (C) having a molecular weight (Mw) of from 30 000 to 300 000 g/mol.

Particular preference is given to a copolymer (C) described hereinabove and having a core constructed from at least one of the hydrophobic monomers cited as component (C1), preferably from ethyl acrylate, wherein this core is grafted with a copolymer constructed from the components (C1) and (C2).

It is particularly preferable when the copolymer C is constructed from
($c_{11}$) 5 to 20 wt %, based on the total amount of the copolymer C, of one or more hydrophobic monomers (C1), preferably ethyl acrylate, as the core;
($c_{12}$) 80 to 95 wt %, based on the total amount of the copolymer C, of a shell grafted onto the core and constructed from
  ($c_{121}$) 93 to 97 wt %, based on the total amount of the monomers forming the shell, of at least one hydrophobic monomer (C1), preferably ethyl acrylate;
  ($c_{122}$) 3 to 7 wt %, based on the total amount of the monomers forming the shell, of at least one hydrophilic monomer (C2), preferably methacrylamide.

It is very particularly preferable when the copolymer C is constructed from
($c_{11}$) 8 to 12 wt %, based on the total amount of the copolymer C, of ethyl acrylate as the core, and
($c_{12}$) 88 to 92 wt %, based on the total amount of the copolymer C, of a shell grafted onto the core and constructed from
  ($c_{121}$) 93 to 97 wt %, based on the total amount of the monomers forming the shell, of ethyl acrylate and
  ($c_{122}$) 3 to 7 wt %, based on the total amount of the monomers forming the shell, of methacrylamide.

Preference is accordingly given to a process for producing the agglomerating component (C) comprising monomer components (C1) and (C2), in particular ethyl acrylate and methacrylamide, said process comprising initially polymerizing a portion of (C1), in particular ethyl acrylate, (formation of the substrate) and subsequently adding the remaining portion of (C1), in particular ethyl acrylate, and (C2), in particular methacrylamide, as a mixture. The portions correspond to the ratios described hereinabove.

The production of the agglomerating copolymer C employed in accordance with the invention is carried out according to processes known to those skilled in the art, particularly advantageously by emulsion polymerization, and the emulsifiers cited hereinabove for the graft substrate B1 may be employed.

It is preferable in accordance with the invention to employ the sodium and potassium salts of alkylsulfonates comprising 10 to 18 carbon atoms. The emulsifiers are advantageously employed in an amount of from 0.5 to 5 wt %, preferably 0.5 to 2 wt %, based on the total monomer content of the copolymer (C).

The invention further provides a process for producing the core/shell copolymers (C) described hereinabove by an emulsion polymerization comprising the steps of:
(x) emulsion polymerizing at least one monomer (C1) as defined hereinabove in a first step and
(y) adding a monomer mixture comprising monomers (C1+C2) in a further step, wherein the steps (x) and (y) are performed in the presence of at least one emulsifier which is employed in an amount of from 0.05 to 0.50 wt %, preferably 0.05 to 0.20 wt %, in step (x)
and in an amount of from 0.45 to 4.50 wt %, preferably 0.45 to 1.80 wt %, in step (y), in each case based on the total monomer content.

Emulsifiers that have proven advantageous in the abovementioned process according to the invention are likewise the sodium and potassium salts of alkylsulfonates comprising 10 to 18 carbon atoms.

The invention further provides core/shell copolymers (C) obtainable by the abovementioned process.

The copolymer (C) is preferably employed as an aqueous dispersion, as a so-called agglomeration latex.

The agglomerating copolymer (C) preferably has a polydispersity U of less than 0.26, more preferably of less than 0.25.

According to a preferred embodiment the polydispersity U of the agglomerating copolymer (C) is in the range of from 0.26 to 0.20, in particular in the range of from 0.25 to 0.21.

The agglomerating copolymer (C) preferably has a $d_{50}$ value of from 110 to 140 nm, particularly preferably from 115 to 140 nm, very particularly preferably from 120 to 135 nm.

A preferred embodiment employs an agglomerating copolymer (C) having a polydispersity U of less than 0.26, in particular of less than 0.25, and a $d_{50}$ value of from 110 to 140 nm, in particular of 115 to 140 nm, very particularly preferably of from 120 to 135 nm.

A further preferred embodiment employs an agglomerating copolymer (C) having a polydispersity U in the range of from 0.26 to 0.20, in particular in the range of from 0.25 to 0.21, and a $d_{50}$ value of from 100 to 150, preferably 110 to 140 nm, in particular of 115 to 140 nm, very particularly preferably of from 120 to 135 nm.

In the context of the present application the abovementioned embodiments may be combined with one another.

Particular preference is given to employing a copolymer (C) composed of 92 to 98 wt %, based on the total solids in (C), of ethyl acrylate and 2 to 8 wt %, based on the total solids in (C), of methylacrylamide having a polydispersity U of less than 0.26, in particular of less than 0.25, and a $d_{50}$ value of from 110 to 140 nm, in particular from 115 to 140 nm, very particularly preferably from 120 to 135 nm.

Particular preference is further given to employing a copolymer (C) composed of 92 to 98 wt %, based on the total solids in (C), of ethyl acrylate and 2 to 8 wt %, based on the total solids in (C), of methylacrylamide having a polydispersity U in the range of from 0.26 to 0.20, in particular in the range of from 0.25 to 0.21, and a $d_{50}$ value of from 110 to 140 nm, in particular from 115 to 140 nm, very particularly preferably from 120 to 135 nm.

Very particular preference is given to employing a copolymer (C) composed of 93 to 97 wt %, based on the total solids in (C), of ethyl acrylate and 3 to 7 wt %, based on the total solids in (C), of methylacrylamide having a polydispersity U of less than 0.26, in particular of less than 0.25, and a $d_{50}$ value of from 110 to 140 nm, in particular from 115 to 140 nm, very particularly preferably from 120 to 135 nm.

It is further very particularly preferable to employ a copolymer C constructed from
($c_{11}$) 8 to 12 wt %, based on the total amount of the copolymer C, of ethyl acrylate as the core, and
($c_{12}$) 88 to 92 wt %, based on the total amount of the copolymer C, of a shell grafted onto the core and constructed from
  ($c_{121}$) 93 to 97 wt %, based on the total amount of the monomers forming the shell, of ethyl acrylate and
  ($c_{122}$) 3 to 7 wt %, based on the total amount of the monomers forming the shell, of methacrylamide,
having a polydispersity U in the range of from 0.26 to 0.20, in particular in the range of from 0.25 to 0.21, and a $d_{50}$ value of from 110 to 140 nm, in particular from 115 to 140 nm, very particularly preferably from 120 to 135 nm.

Agglomeration of the Graft Substrate (B1)

The agglomeration of the graft substrate (B1) is generally achieved by adding a dispersion of the copolymer (C) described hereinabove. The concentration of the copolymer (C) in the dispersion used for agglomeration shall generally be between 3 to 60 wt %, preferably between 5 to 40 wt %.

The agglomeration generally employs from 0.1 to 5 parts by weight, preferably from 0.5 to 3 parts by weight, of the dispersion of the copolymer C per 100 parts of the graft substrate B1, in each case reckoned on solids.

The agglomeration is generally carried out at a temperature of from 20° C. to 120° C., preferably from 30° C. to 100° C., more preferably from 30° C. to 75° C. The addition of C may be effected in one go or portionwise, continuously or with a feed profile over a particular time period. According to a preferred embodiment the addition of C is effected such that 1/1 to 1/100 of the total amount of C is introduced per minute. The agglomeration time, i.e. the time from the beginning of the addition of C to the start of the subsequent graft copolymerization, is preferably from one minute to two or more hours, for example to 2 hours, particularly preferably from 10 to 60 minutes.

Basic electrolytes may optionally be added to the agglomeration in an amount of from 1 to 50 wt % (based on 100 wt % of the solids content of the copolymer C). Useful basic electrolytes include organic or inorganic hydroxides. Inorganic hydroxides especially are useful. Particular preference is given to using lithium hydroxide, sodium hydroxide or potassium hydroxide. According to one of the particularly preferred embodiments KOH is used as the basic electrolyte. According to another preferred embodiment NaOH is used as the basic electrolyte. However, it is also possible to employ mixtures of two or more basic electrolytes. This may be advantageous, for example, when the growth of the rubber particles is to be precisely controlled. Hence it may be useful, for example, to employ mixtures of LiOH with KOH or mixtures of LiOH with NaOH. It is likewise possible to use mixtures of KOH and NaOH and this constitutes a further preferred embodiment. The electrolytes are generally dissolved prior to addition. A preferred solvent is the aqueous phase.

Preference is given to using diluted solutions, for example solutions having a concentration in the range of from 0.001 to 0.1, in particular from 0.001 to 0.05, preferably less than 0.03, for example less than 0.025 g of basic electrolyte/ml of solvent.

The addition of the basic electrolytes may be effected prior to the addition of copolymer C, simultaneously therewith or separately therefrom or after addition of B1. It is also possible to premix the basic electrolytes in the dispersion of C.

According to a preferred embodiment the addition of the basic electrolytes is effected prior to the addition of the agglomeration polymer. The basic electrolyte is generally employed in an amount in the range of from 0.01 to 4 wt %, preferably 0.05 to 2.5, in particular 0.1 to 1.5 wt % based on the rubber B (solids).

The pH during the agglomerization is generally from 6 to 13. According to a preferred embodiment the pH is from 8 to 13.

Agglomerated Graft Substrate B1

The graft substrate B1 obtained after the agglomeration has a bimodal particle size distribution of fractions x) and y) where x) is a fraction of nonagglomerated particles and y) is a fraction of agglomerated particles having a $d_{50}$ value in the range of from 350 to 550 nm and a polydispersity U of less than 0.28. The nonagglomerated particles of the fraction x) generally have a $d_{50}$ value in the range of from 80 to 120 nm.

The weight fraction of the particles of the fraction x) of the agglomerated graft substrate B1 is generally 15 to 40 wt %, preferably 20 to 30 wt %, and the fraction of the particles of the fraction y) is generally 60 to 85 wt %, preferably 70 to 80 wt %, based on the total mass of the particles, x) and y) generally summing to 100 wt %.

The agglomerated graft substrate B1 preferably comprises a fraction y) of agglomerated particles having a $d_{50}$ value in the range of from 350 to 500 nm, particularly preferably 350 to 450 nm, very particularly preferably 350 to 400 nm, and/or a polydispersity U of less than 0.27, in particular less than 0.26.

The obtained dispersion of the agglomerated graft substrate B1 is relatively stable and may be readily stored and transported without onset of coagulation.

The agglomerated graft substrate B1 is used to produce graft copolymers B according to the invention.

Graft Copolymer B

To produce the graft copolymers B according to the invention the agglomerated graft substrate B1 is grafted with the monomers B21 and B22.

The graft copolymer B generally comprises 40 to 85, based on the solids content of the graft copolymer B, of a graft substrate (B1) and 15 to 60 wt %, based on the solids content of the graft copolymer B, of a graft sheath (B2). B1 and B2 sum to 100 wt %.

The graft sheath (B2) may be obtained by reaction of (B21) 70 to 90 wt %, preferably 75 to 85 wt %, of styrene and/or α-methylstyrene, in particular styrene, and (B22) 10 to 30 wt %, preferably 15 to 25 wt %, of acrylonitrile, methacrylonitrile and/or methyl methacrylate, in particular acrylonitrile, in the presence of the agglomerated graft substrate (B1). B21 and B22 sum to 100 wt %.

Preferred graft sheaths B2 are constructed from: B2-1 copolymers of styrene and acrylonitrile, B2-2 copolymers of α-methylstyrene and acrylonitrile. Particular preference is given to B2-1 copolymers of styrene and acrylonitrile.

Particularly preferred graft sheaths B2 are obtained by reaction of from 75 to 85 wt % of styrene and from 15 to 25 wt % of acrylonitrile.

The graft sheath (B2) is preferably prepared by an emulsion polymerization process after performing the above described agglomeration of the graft substrate (B1).

The graft copolymerization for preparing the graft sheath (B2) may be performed in the same system as the emulsion polymerization for producing the graft substrate (B1) and further emulsifiers and assistants may be added if necessary. The monomer mixture to be grafted onto the graft substrate according to one embodiment of the invention may be added to the reaction mixture all at once, spread over a plurality of stages—for example to construct a plurality of graft superstrates—or in continuous fashion during the polymerization. The monomers B21 and B22 (in particular styrene and acrylonitrile) may preferably be added simultaneously.

In accordance with an embodiment of the invention the graft sheath (B2) is polymerized from a monomer mixture composed of the components B21 and B22, in particular styrene and acrylonitrile, in the presence of the agglomerated graft substrate (B1) obtained according to the above described process. The monomers may be added individually or in mixtures with one another. For example it is possible to initially graft B21 alone and subsequently graft a mixture of B21 and B22. This graft copolymerization is advantageously again performed in aqueous emulsion under the customary conditions described hereinabove for the graft substrate.

Particulars pertaining to the performance of the graft reaction are known to those skilled in the art and are disclosed, for example, in DE-A 24 27 960 and EP-A 0 062 901.

Preference is given to graft copolymers B constructed from:
B1: 40 to 85 wt %, based on the solids content of the graft copolymer B, of a graft substrate (B1) obtainable by (a) polymerizing:
(B11): 0 to 10 wt %, based on the graft substrate B1, of styrene, and
(B12): 90 to 100 wt %, based on the graft substrate B1, of butadiene,
where (B11) and (B12) sum to 100 wt %;
and (b) agglomerating the obtained graft substrate B1 by adding (C): 0.01 to 5 parts by weight, based on 100 parts by weight of the graft substrate B1, in each case based on the solids content, of an agglomerating copolymer (C) of:
(C1): 80 to 99.9 wt % of ethyl acrylate and
(C2): 0.1 to 20 wt % of methylacrylamide,
where (C1) and (C2) sum to 100 wt %; and
B2: 15 to 60 wt %, based on the solids content of the graft copolymer B, of a graft sheath obtainable by reacting the agglomerated graft substrate B1 with a mixture of:
(B21) 70 to 90 wt %, based on the graft sheath B2, of styrene, and
(B22) 10 to 30 wt %, based on the graft sheath B2, of acrylonitrile,
where the graft substrate B1 and the graft sheath B2 sum to 100 wt % in total;

characterized in that
(iii) the agglomerating copolymer (C) has a polydispersity U of less than 0.27, preferably in the range of from 0.26 to 0.20, and a $d_{50}$ value of from 100 to 150 nm, preferably of from 110 to 140 nm, and
(iv) the agglomerated graft substrate B1 has a bimodal particle size distribution of a fraction x) of nonagglomerated particles having a $d_{50}$ value in the range of from 80 to 120 nm and a fraction y) of agglomerated particles having a $d_{50}$ value in the range of from 350 to 550 nm and a polydispersity U of less than 0.28.

The graft copolymers B according to the invention may be further used as they are obtained in the reaction mixture, for example as a latex emulsion or latex dispersion. Alternatively, however, they may also be worked up in a further step. Workup measures are known in principle to those skilled in the art. Examples of workup steps include the isolation of the graft copolymers B from the reaction mixture, for example by spray drying, shearing or by precipitation with strong acids or using other precipitants, for example from inorganic compounds such as magnesium sulfate. A further workup step example is the drying of the isolated rubber. The solids content of the dispersion of the graft rubber is about 40 wt %.

The invention further provides a process for producing the above-described graft copolymers B according to the invention by:
(i) polymerizing the monomers B12 and B11 in aqueous emulsion to afford a particulate graft substrate B1,
(ii) agglomerating the particulate graft substrate B1 which is in the form of an emulsion using an agglomerating copolymer (C), wherein the copolymer (C) has a polydispersity U of less than 0.27 and a $d_{50}$ value of from 100 to 150 nm to afford an agglomerated particulate graft substrate B1 and subsequently
(iii) polymerizing the monomers B21 and B22 of the graft sheath in aqueous emulsion in the presence of the agglomerated particulate graft substrate B1.
B, B12, B11, B1, C, B21 and B22 are as defined for the graft copolymer according to the invention.

In accordance with the process of the invention the obtained particulate graft substrate B1 generally has a $d_{50}$ value of from 80 to 120 nm.

The invention further provides a thermoplastic molding compound comprising the graft copolymer B according to the invention and a thermoplastic copolymer A and optionally further components K.

The invention provides a thermoplastic molding compound comprising a thermoplastic copolymer A and a graft copolymer B and optionally further components K, wherein the molding compound comprises:
A: 40 to 80 wt % of at least one thermoplastic copolymer A obtainable from:
A1: 20 to 31 wt %, based on the copolymer A, of acrylonitrile and
A2: 69 to 80 wt %, based on the copolymer A, of styrene or α-methylstyrene or a mixture of styrene and α-methylstyrene,
B: 20 to 60 wt % of the graft copolymer B according to the invention; and
K: 0 to 5 wt % of further components K,
where the components A, B and K sum to 100 wt %.

Copolymer A

The copolymer A is preferably produced from the components acrylonitrile and styrene and/or α-methylstyrene by bulk polymerization or in the presence of one or more solvents. Preference is given to copolymers A having molar masses $M_w$ of from 50 000 to 300 000 g/mol, where the molar masses may be determined, for example, by light scattering in tetrahydrofuran (GPC with UV detection). The copolymer A forms the matrix of the thermoplastic molding compound.

The copolymer A may in particular comprise or consist of:
(Aa) polystyrene-acrylonitrile, produced from, based on (Aa), 69 to 80 wt % of styrene and 20 to 31 wt % of acrylonitrile, or
(Ab) poly-α-methylstyrene-acrylonitrile, produced from, based on (Ab), 69 to 80 wt % of α-methylstyrene and 20 to 31 wt % of acrylonitrile, or
(Ac) a mixture of the copolymer matrix (Aa) and the copolymer matrix (Ab).

The copolymer A may also be obtained by copolymerization of acrylonitrile, styrene and α-methylstyrene. However, it is also possible in principle to employ polymer matrices containing further monomer building blocks.

The number-averaged molecular weight ($M_n$) of the copolymer matrix A is preferably from 15 000 to 100 000 g/mol (determined by GPC with UV detection).

The viscosity (V2) of the copolymer matrix A (determined according to DIN 53726 at 25° C. in a 0.5 wt % solution in DMF) is, for example, from 50 to 120 ml/g. The copolymer matrix A may be produced by bulk polymerization/solution polymerization in, for example, toluene or ethylbenzene according to a process such as is described, for example, in Kunststoff-Handbuch, Vieweg-Daumiller, Vol V, (Polystyrol), Carl-Hanser-Verlag, Munich 1969, pages 122 f., lines 12 ff.

As previously described hereinabove the preferred copolymer matrix component A is a polystyrene-acrylonitrile, poly-α-methylstyrene-acrylonitrile or mixtures thereof. In a preferred embodiment of the invention after production the component A is isolated according to processes known to those skilled in the art and preferably processed into pellets.

The invention further provides a thermoplastic molding compound which additionally comprises at least one further thermoplastic polymer (TP) selected from the group of polycarbonates, polyester carbonates, polyesters and polyamides.

The copolymers A employed in accordance with the invention in the molding compound may also be mixed with, for example, further thermoplastic polymers (TP). Suitable examples include, in particular, semicrystalline polyamides, semiaromatic copolyamides, polyesters, polyoxyalkylene, polyarylene sulfides, polyether ketones, polyvinyl chlorides, and/or polycarbonates.

The suitable polycarbonates/polyester carbonates may be linear or branched. Branched products are preferably obtained by incorporating from 0.05 to 2.0 mol %, based on the sum of the employed diphenols, of trifunctional or more than trifunctional compounds, for example those comprising three or more than three phenolic
OH groups. The polycarbonates/polyester carbonates may comprise aromatically-bonded halogen, preferably bromine and/or chlorine. However, they are preferably halogen-free. They have average molecular weights ($M_w$, weight-average; determined, for example, by ultracentrifugation or light scattering) of from 10 000 to 200 000, preferably from 20 000 to 80 000.

Suitable thermoplastic polyesters are preferably polyalkylene terephthalates, i.e. reaction products of aromatic dicarboxylic acids or the reactive derivatives thereof (for example dimethyl esters or anhydrides) and aliphatic, cycloaliphatic or arylaliphatic diols and mixtures of such reaction products. Preferred polyalkylene terephthalates may be produced from terephthalic acids (or the reactive derivatives thereof) and aliphatic or cycloaliphatic diols comprising 2 to 10 carbon atoms according to known methods (see Kunststoff-Handbuch, volume VIII. pp 695 if, Carl Hanser Verlag, Munich 1973). In preferred polyalkylene terephthalates 80 to 100, preferably 90 to 100 mol % of the dicarboxylic acid radicals are terephthalic acid radicals and 80 to 100, preferably 90 to 100 mol % of the diol radicals are ethylene glycol and/or 1,4-butanediol radicals. The polyalkylene terephthalates may comprise, in addition to ethylene glycol/1,4-butanediol radicals, 0 to 20 mol % of radicals of other aliphatic diols comprising 3 to 12 carbon atoms or cycloaliphatic diols comprising 6 to 12 carbon atoms (see, for example, DE 2 407 647, DE 2 407 776 and DE 2715 932). The polyalkylene terephthalates may be branched by the incorporation of relatively small amounts of tri- or tetrahydric alcohols or tri- or tetrabasic carboxylic acids such as are described in DE 1 900 270 and U.S. Pat. No. 3,692,744.

Examples of preferred branching agents include trimesic acid, trimellitic acid, trimethylolethane, trimethylolpropane, and pentaerythritol. It is advisable to use not more than 1 mol % of the branching agent based on the acid component. Preference is given to polyalkylene terephthalates produced solely from terephthalic acid and the reactive derivatives thereof (for example the dialkyl esters thereof) and ethylene glycol and/or 1,4-butanediol and mixtures of these polyalkylene terephthalates. Preferred polyalkylene terephthalates also include copolyesters produced from at least two of the abovementioned alcohol components: particularly preferred copolyesters are poly(ethylene glycol 1,4-butanediol) terephthalates.

Suitable polyamides include known homopolyamides, copolyamides and mixtures of these polyamides. Said polyamides may be semicrystalline and/or amorphous polyamides.

Suitable semicrystalline polyamides includes polyamide 6, polyamide 6,6 and mixtures and corresponding copolymers of these components.

Also suitable are semicrystalline polyamides whose acid component consists wholly or partially of terephthalic acid and/or isophthalic acid and/or suberic acid and/or sebacic acid and/or azelaic acid and/or adipic acid and/or cyclohexanedicarboxylic acid, whose diamine component consists wholly or partially of m- and/or p-xylylenediamine, and/or hexamethylenediamine and/or 2,2,4-trimethylhexamethylenediamine and/or 2,2,4-trimethylhexamethylenediamine and/or isophoronediamine and whose composition is known. Also citable are polyamides produced wholly or partially from lactams comprising 7 to 12 carbon atoms in the ring, optionally with the concomitant use of one or more of the abovementioned starting components.

Amorphous polyamides that may be employed include known products obtained by polycondensation of diamines such as ethylenediamine, hexamethylenediamine, decamethylenediamine, 2,2,4- and/or 2,4,4-trimethylhexamethylenediamine, m- and/or p-xylylenediamine, bis(4-aminocyclohexyl)methane, bis(4-aminocyclohexyl)propane, 3,3'-dimethyl-4,4'-diaminodicyclohexylmethane, 3-aminomethyl-3,5,5-trimethylcyclohexylamine, 2,5- and/or 2,6-bis(aminomethyl)norbornane and/or 1,4-diaminomethylcyclohexane with dicarboxylic acids such as oxalic acid, adipic acid, azelaic acid, decanedicarboxylic acid, heptadecanedicarboxylic acid, 2,2,4- and/or 2,4,4-trimethyladipic acid, isophthalic acid and terephthalic acid.

Copolymers obtained by polycondensation of a plurality of monomers are also suitable, as are copolymers produced in the presence of aminocarboxylic acids such as ε-aminocaproic acid, ω-aminoundecanoic acid or ω-aminolauric acid or the lactams thereof. Particularly suitable amorphous polyamides include polyamides produced from isophthalic acid, hexamethylenediamine and further diamines such as 4,4'-diaminodicyclohexylmethane, isophoronediamine, 2,2,4- and/or 2,4,4-trimethylhexamethylenediamine, 2,5- and/or 2,6-bis(aminomethyl)norbornene; or from isophthalic acid, 4,4'-diaminodicyclohexylmethane and -caprolactam; or from isophthalic acid, 3,3'-dimethyl-4,4'ϵ-caprolactam; or from isophthalic acid, 3,3'-dimethyl-4,4'-diaminodicyclohexylmethane and laurolactam; or from terephthalic acid and the isomer mixture of 2,2,4- and/or 2,4,4-trimethylhexamethylenediamine.

It is also possible to employ mixtures of two or more of the cited polymers (TP). The thermoplastic molding compounds according to the invention may comprise, based on the amount of copolymer A plus graft copolymer B, from 0 to 90 wt %, preferably 0 to 50 wt %, particularly preferably 0 to 20 wt % of the abovementioned polymers (TP).

Preference is given to a thermoplastic molding compound according to the invention composed of copolymer A and graft copolymer B and optionally further components K.

As the further components (K), the thermoplastic molding compound may comprise one or more components selected from the group consisting of dispersants (DM), fillers (F) and added substances (D).

As the component K, the thermoplastic molding compounds according to the invention may further also comprise 0 to 5 wt % of fibrous or particulate fillers (F) or mixtures thereof, in each case based on the amount of the components A plus B plus K. Examples of fillers or reinforcers that may be employed include glass fibers that may be finished with a sizing and a coupling agent, glass beads, mineral fibers, aluminum oxide fibers, mica, quartz flour or wollastonite. It is also possible to admix with the molding compounds according to the invention metal flakes, metal powder, metal fibers, metal-coated fillers, for example nickel-coated glass fibers, and other additive substances that shield electromagnetic waves. It is also possible to add carbon fibers, carbon black, in particular conductivity carbon black, or nickel-coated carbon fibers.

Various additives (D) may be added to the molding compounds according to the invention in amounts of from 0 to 5 wt % as assistants and processing additives. Suitable added substances (D) include all substances customarily employed for processing or finishing the polymers.

Examples include, for example, dyes, pigments, colorants, antistats, antioxidants, stabilizers for improving thermal stability, stabilizers for increasing photostability, stabilizers for enhancing hydrolysis resistance and chemical resistance, anti-thermal decomposition agents and in particular lubricants/glidants that are useful for production of molded bodies/articles. These further added substances may be admixed at any stage of the manufacturing operation, but preferably at an early stage in order to profit early on from the stabilizing effects (or other specific effects) of the added substance. For further customary assistants and added substances, see, for example, "Plastics Additives Handbook", Ed. Gächter and Müller, 4th edition, Hanser Publ., Munich, 1996.

Examples of suitable pigments include titanium dioxide, phthalocyanines, ultramarine blue, iron oxides or carbon black, and also the entire class of organic pigments.

Examples of suitable colorants include all dyes that may be used for the transparent, semi-transparent, or non-transparent coloring of polymers, in particular those suitable for coloring styrene copolymers.

Examples of suitable flame retardants that may be used include the halogen-containing or phosphorus-containing compounds known to the person skilled in the art, magnesium hydroxide, and also other commonly used compounds, or mixtures thereof.

Examples of suitable antioxidants include sterically hindered monocyclic or polycyclic phenolic antioxidants which may comprise various substitutions and may also be bridged by substituents. These include not only monomeric but also oligomeric compounds, which may be constructed of a plurality of phenolic units. Hydroquinones and hydroquinone analogs are also suitable, as are substituted compounds, and also antioxidants based on tocopherols and derivatives thereof. It is also possible to use mixtures of different antioxidants. It is possible in principle to use any compounds which are customary in the trade or suitable for styrene copolymers, for example antioxidants from the Irganox range. In addition to the phenolic antioxidants cited above by way of example, it is also possible to use so-called costabilizers, in particular phosphorus- or sulfur-containing costabilizers. These phosphorus- or sulfur-containing costabilizers are known to those skilled in the art.

Examples of suitable light stabilizers include various substituted resorcinols, salicylates, benzotriazoles and benzophenones. Suitable matting agents include not only inorganic substances such as talc, glass beads or metal carbonates (for example $MgCO_3$, $CaCO_3$) but also polymer particles, in particular spherical particles having diameters $d_{50}$ greater than 1 mm, based on, for example, methyl methacrylate, styrene compounds, acrylonitrile or mixtures thereof. It is further also possible to use polymers comprising copolymerized acidic and/or basic monomers.

Examples of suitable antidrip agents include polytetrafluoroethylene (Teflon) polymers and ultrahigh molecular weight polystyrene (molar mass $M_w$ above 2 000 000).

Examples of fibrous/pulverulent fillers include carbon or glass fibers in the form of glass fabrics, glass mats, or filament glass rovings, chopped glass, glass beads, and wollastonite, particular preference being given to glass fibers. When glass fibers are used they may be finished with a sizing and a coupling agent to improve compatibility with the blend components.

The glass fibers incorporated may either take the form of short glass fibers or else continuous filaments (rovings).

Examples of suitable particulate fillers include carbon black, amorphous silica, magnesium carbonate, powdered quartz, mica, bentonites, talc, feldspar or, in particular, calcium silicates, such as wollastonite, and kaolin.

Examples of suitable antistats include amine derivatives such as N,N-bis(hydroxyalkyl)alkylamines or -alkyleneamines, polyethylene glycol esters, copolymers of ethylene oxide glycol and propylene oxide glycol (in particular two-block or three-block copolymers of ethylene oxide blocks and propylene oxide blocks), and glycerol mono- and distearates, and mixtures thereof.

Examples of suitable stabilizers include hindered phenols but also vitamin E/compounds having analogous structures and also butylated condensation products of p-cresol and dicyclopentadiene. HALS stabilizers (Hindered Amine Light Stabilizers), benzophenones, resorcinols, salicylates, benzotriazoles are also suitable. Other suitable compounds include, for example, thiocarboxylic esters. Also usable are $C_6$-$C_{20}$) alkyl esters of thiopropionic acid, in particular the stearyl esters and lauryl esters. It is also possible to use the dilauyl ester of thiodipropionic acid (dilauryl thiodipropionate), the distearyl ester of thiodipropionic acid (distearyl thiodipropionate) or mixtures thereof. Examples of further additives include HALS absorbers, such as bis(2,2,6,6-tetramethyl-4-piperidyl) sebacate or UV absorbers such as 2H-benzotriazol-2-yl-(4-methylphenol). Such additives are typically used in amounts of from 0.01 to 2 wt % (based on the overall mixture).

Suitable glidants and demolding agents include stearic acids, stearyl alcohol, stearic esters, amide waxes (bisstearylamide), polyolefin waxes and/or generally higher fatty acids, derivatives thereof and corresponding fatty acid mixtures comprising 12 to 30 carbon atoms. Also particularly suitable is ethylenebisstearamide (for example Irgawax from Ciba, Switzerland). The amounts of these additions are in the range of from 0.05 to 5 wt %.

Also suitable as added substances are silicone oils, oligomeric isobutylene or similar substances. Typical amounts, when employed, are from 0.001 to 3 wt % based on the amount of the components A plus B plus K. Also usable are pigments, dyes, optical brighteners, such as ultramarine blue, phthalocyanines, titanium dioxide, cadmium sulfides, derivatives of perylenetetracarboxylic acid. Processing assistants and stabilizers such as UV stabilizers, heat stabilizers (for example butylated reaction products of p-cresol and dicyclopentadiene, Wingstay L from Omnova, or else the dilauryl ester of thiodipropionic acid, Irganox PS 800 from BASF), lubricants and antistats (for example ethylene oxide-propylene oxide copolymers such as Pluronic from BASF), when employed, are typically used in amounts of from 0.01 to 5 wt %, based on the amount of the components A plus B plus K.

The individual added substances are generally used in the respective customary amounts.

The molding compounds of the invention may be produced from the components A and B (and optionally further polymers (TP) and components K) by any known method. However, it is preferable when the components are blended by melt mixing, for example conjoint extrusion, kneading or rolling of the components. This is done at temperatures in the range of from 160° C. to 400° C., preferably from 180° C. to 280° C. In a preferred embodiment, the component (B) is first partially or completely isolated from the aqueous dispersion obtained in the respective production steps. For example, the graft copolymers B may be mixed as a moist or dry crumb/powder (for example having a residual moisture of from 1 to 40%, in particular 20 to 40%) with the matrix polymers, complete drying of the graft copolymers then taking place during the mixing. The drying of the particles may also be performed as per DE-A 19907136.

The invention further provides for the use of the described molding compounds for the production of molded articles such as sheets or semifinished products, films, fibers or else of foams and the corresponding molded articles such as sheets, semifinished products, films, fibers or foams.

Processing may be carried out using the known processes for thermoplast processing, in particular production may be effected by thermoforming, extruding, injection molding, calendaring, blow molding, compression molding, press sintering, deep drawing or sintering, preferably by injection molding.

The molding compounds according to the invention have exceptional mechanical properties such as toughness and stiffness.

The molding compounds according to the invention were further found to have improved surface gloss.

The examples and claims which follow further elucidate the invention.

The analytical methods used to characterize the polymers are initially briefly summarized:

a) Charpy notched impact strength [$kJ/m^2$]:

The notched impact strength is determined on test specimens (80×10×4 mm, produced by injection molding at a compound temperature of 240° C. and a mold temperature of 70° C.) at 23° C. according to ISO 179-1A b) Flowability (MVR [ml/10 min]):

The flowability is determined on a polymer melt at 220° C. with a load of 10 kg according to ISO 1133.

c) Particle size [nm]:

The weight-average particle size $d_w$ of the rubber dispersions of the graft substrate B1 and the agglomerated graft substrate B1 was measured using a CPS Instruments Inc. DC 24000 disk centrifuge. Measurement was performed in 17.1 ml of an aqueous sugar solution with a sucrose density gradient of from 8 to 20 wt % to achieve stable flotation behavior of the particles. A polybutadiene latex having a narrow distribution and an average particle size of 405 nm was used for calibration. The measurements were taken at a disk rotational speed of 24 000 rpm by injection of 0.1 ml of a diluted rubber dispersion (aqueous 24 wt % sucrose solution, comprising about 0.2-2 wt % of rubber particles) into the disk centrifuge containing the aqueous sugar solution having a sucrose density gradient of from 8 to 20 wt %.

The weight-average particle size $d_w$ of the agglomerating copolymer (C) was measured with the CPS Instruments Inc. DC 24000 disk centrifuge using 17.1 ml of an aqueous sugar solution having a sucrose density gradient of from 3.5 to 15.5 wt % to achieve stable sedimentation behavior of the particles. A polyurethane latex (particle density 1.098 g/ml) having a narrow distribution and an average particle size of 155 nm was used for calibration. The measurements were taken at a disk rotational speed of 24 000 rpm by injection of 0.1 ml of a diluted dispersion of the copolymer C (produced by diluting with water to a content of 1-2%) into the disk centrifuge containing the aqueous sugar solution having a sucrose density gradient of from 3.5 to 15.5 wt %.

The weight-average particle size $d_w$, the weight-average particle diameter $d_{50}$ and $d_{10}$ and $d_{90}$ were calculated using the formula:

$$d_w = \mathrm{sum}(n_i * d_i^4)/\mathrm{sum}(n_i * d_i^3)$$

$n_i$: number of particles of diameter $d_i$)

The solids contents were measured after drying the samples at 180° C. for 25 min in a drying cabinet.

d) Swell index QI and gel content [%]:

The gel content values were determined with the wire cage method in toluene (see Houben-Weyl, Methoden der Organischen Chemie, Makromolekulare Stoffe, part 1, page 307 (1961) Thieme Verlag Stuttgart).

A film was produced from the aqueous dispersion of the graft substrate by evaporation of the water. 0.2 g of this film was admixed with 50 g of toluene. After 24 hours the toluene was removed from the swelled sample and the sample was weighed. After 16 hours of drying in vacuo at 110° C. the sample was weighed again.

The swell index is determined by:

$$\text{swell index } QI = \frac{\text{Swelled gel with toluene prior to drying}}{\text{gel after drying}}$$

The gel content is determined by:

$$\text{gel content} = \frac{\text{mass of sample dried in vacuo}}{\text{weight of sample prior to swelling}} \times 100\%$$

e) Gloss characteristics

To determine the gloss characteristics rectangular platelets having dimensions of 60 mm×40 mm×2 mm are produced from the polymer melt using an injection molding machine at a compound temperature of 240° C. and a mold temperature of 70° C. The surface gloss is measured by reflectance measurement according to DIN 67530 at an angle of 20°.

f) Yellowness index YI

The YI value was determined on platelets having dimensions of 60×40×2 mm and produced by injection molding at a compound temperature of 240° C. and a mold temperature of 70° C. according to ASTM method E313-96 (illuminant/observer combination C/2°).

EXAMPLES

Graft Substrate B1

The graft substrate B1-1 is produced by emulsion polymerization using the feed stream addition process. 7 wt % of styrene is used as the comonomer.

The emulsion polymerization is performed in a 150 L reactor at a temperature of 67° C. 43 120 g of the monomer mixture (butadiene and styrene) are polymerized at 67° C. in the presence of 431.2 g of tert-dodecylmercaptan (TDM), 311 g of potassium stearate, 82 g of potassium persulfate, 147 g of sodium hydrogencarbonate and 58 400 g of water to obtain a latex of the graft substrate having a solids content of 41.5 wt %.

The monomers are introduced into the reactor in the following order:

Initially, styrene is added in an amount of 7 wt %, based on the total monomer amount, over 20 minutes. Following the styrene addition, a first portion of the butadiene is added in an amount of 7 wt %, based on the total monomer amount, over 25 minutes. The remaining portion of the butadiene which amounts to 86 wt %, based on the total monomer amount, is subsequently added over 8.5 hours. TDM is added all at once at the beginning of the reaction. The conversion achieved is ≥95%.

Further data pertaining to the graft substrate B1:

| graft substrate | | B1 |
|---|---|---|
| total styrene content | wt % | 7 |
| core styrene content | wt % | 7 |
| gel content | wt % | 76.6 |
| QI | | 22 |
| $d_w$ | nm | 100.1 |
| $d_{10}$ | nm | 78.7 |
| $d_{50}$ | nm | 94.2 |
| $d_{90}$ | nm | 103.8 |
| U | | 0.27 |

Agglomerating Copolymer C-1 (Inventive)

The copolymer C-1 is produced by emulsion polymerization.

First, 6.29 g of Mersolat H95 (Lanxess Deutschland GmbH, emulsifier, $C_{12}$-$C_{18}$—$SO_3^-K^+$) are dissolved in 1177.2 g of demineralized water and heated to 60° C. with stirring under a nitrogen atmosphere. 4.87 g of potassium persulfate dissolved in 209.2 g of demineralized water are added to this solution with continued stirring. After 15 minutes 211.2 g of ethyl acrylate are introduced over 18 minutes with a concomitant temperature increase from 60° C. to 80° C. The following three feeds are then introduced over 405 minutes:

a) 1691.3 g of ethyl acrylate
b) 3.98 g of potassium persulfate dissolved in 170.9 g of demineralized water
c) solution of 32.95 g of Mersolat H95 (Lanxess Deutschland GmbH) and 90.6 g of methacrylamide in 1248.8 g of demineralized water.

Once addition of the feeds a-c) is complete the polymerization is continued for 60 minutes at 80° C. with stirring. This is followed by cooling to room temperature and addition of 150.9 g of demineralized water. The solids content of the latex of the agglomerating copolymer C1 is 40.8 wt %.

Further data pertaining to copolymer C-1:

| copolymer | | C-1 |
|---|---|---|
| $d_w$ | nm | 127.0 |
| $d_{10}$ | nm | 110.6 |
| $d_{50}$ | nm | 128.9 |
| $d_{90}$ | nm | 140.8 |
| U | | 0.238 |

Agglomerating Copolymer C-2 (Comparative Example)

The copolymer C-2 is produced by emulsion polymerization.

First, 5.98 g of Mersolat H95 (Lanxess Deutschland GmbH, emulsifier, $C_{12}$-$C_{18}$—$SO_3^-K^+$) are dissolved in 1177.5 g of demineralized water and heated to 60° C. with stirring under a nitrogen atmosphere. 4.87 g of potassium persulfate dissolved in 209.2 g of demineralized water are added to this solution with continued stirring.

After 15 minutes 211.2 g of ethyl acrylate are introduced over 18 minutes with a concomitant temperature increase from 60° C. to 80° C. The following three feeds are then introduced over 405 minutes:

a) 1691.3 g of ethyl acrylate
b) 3.98 g of potassium persulfate dissolved in 170.9 g of demineralized water
c) solution of 31.27 g of Mersolat H95 (Lanxess Deutschland GmbH) and 90.6 g of methacrylamide in 1250.4 g of demineralized water.

Once addition of the feeds a-c) is complete the polymerization is continued for 60 minutes at 80° C. with stirring. This is followed by cooling to room temperature and addition of 150.9 g of desalinated water. The solids content of the latex of the agglomerating copolymer C-2 is 40.8 wt %.

Further data pertaining to copolymer C-2 (comparative example):

| copolymer | | C-2 |
|---|---|---|
| $d_w$ | nm | 97.5 |
| $d_{10}$ | nm | 85.2 |
| $d_{50}$ | nm | 98.3 |
| $d_{90}$ | nm | 109.2 |
| U | | 0.244 |

Agglomerating Copolymer C-3 (Comparative Example):

The copolymer C-3 is produced by emulsion polymerization.

First, 2.52 g of Mersolat H95 (Lanxess Deutschland GmbH, emulsifier, $C_{12}$-$C_{18}$—$SO_3^-K^+$) are dissolved in 1155.1 g of demineralized water and heated to 60° C. with stirring under a nitrogen atmosphere. 4.87 g of potassium persulfate dissolved in 209.2 g of demineralized water are added to this solution with continued stirring. After 15 minutes 211.2 g of ethyl acrylate are introduced over 18 minutes with a concomitant temperature increase from 60° C. to 80° C. The following three feeds are then introduced over 405 minutes:

a) 1691.3 g of ethyl acrylate
b) 3.98 g of potassium persulfate dissolved in 170.9 g of demineralized water
c) solution of 36.69 g of Mersolat H95 (Lanxess Deutschland GmbH) and 90.6 g of methacrylamide in 1250.4 g of demineralized water.

Once addition of the feeds a-c) is complete the polymerization is continued for 60 minutes at 80° C. with stirring. This is followed by cooling to room temperature and addition of 150.9 g of demineralized water. The solids content of the latex of the agglomerating copolymer C-3 is 40.5 wt %.

Further data pertaining to copolymer C-3 (comparative example):

| copolymer | | C-3 |
|---|---|---|
| $d_w$ | nm | 154.9 |
| $d_{10}$ | nm | 142.5 |
| $d_{50}$ | nm | 155.6 |
| $d_{90}$ | nm | 166.2 |
| U | | 0.152 |

Agglomerated Graft Substrate B1

General Procedure:

First, 59 parts by weight of the latex of the graft substrate B1, based on the solids content of the latex, are initially charged at a temperature of 68° C. and stirred. 1.357 parts by weight of the latex of the agglomerating copolymer C (based on the latex solids) are diluted with 10.24 parts by weight of demineralized water. This diluted latex is then added over 25 minutes with stirring to agglomerate the graft substrate B1. After five minutes 0.56 part by weight of potassium stearate dissolved in 40.98 parts by weight of demineralized water having a temperature of 68° C. is added to the agglomerated latex of the graft substrate B1 with continued stirring.

The particle size distribution of the agglomerated graft substrate B1 is measured. Only a fraction of the particles in the latex of the graft substrate B1 is agglomerated to larger particles. The agglomeration yield is the fraction of the agglomerated particles in wt % based on the total amount of the particles. The agglomeration yield is determined from the cumulative distribution curve of the particle size measurement. The weight-average particle size $d_{50}$ and the polydispersity U of the particle size distribution of the fraction of agglomerated particles (=fraction y) in the obtained agglomerated latex of the graft substrate B is determined.

| agglomerated graft substrate | B1-1 | B1-2 | B1-3 |
|---|---|---|---|
| example (inventive) | x | | |
| comparative example | | x | x |
| graft substrate B1 | B1 | B1 | B1 |
| copolymer C | C-1 | C-2 | C-3 |
| agglomeration yield [wt %] | 78.1 | 78.4 | 62.5 |
| $d_{50}$ value (nm) for fraction y | 384 | 306 | 449 |
| U of fraction y | 0.25 | 0.34 | 0.17 |

Graft Copolymer B

General Procedure:

Once the agglomeration step is complete 0.074 part by weight of potassium persulfate dissolved in 3.13 parts by weight of demineralized water is added to the agglomerated latex of the graft substrate B1 at 68° C. with continued stirring. A monomer mixture of 32.8 parts by weight of styrene and 8.2 parts by weight of acrylonitrile is added over two hours and 44 minutes while stirring is continued. The temperature is increased to 80° C. over this time period of addition of the styrene/acrylonitrile mixture. Once the addition of the styrene/acrylonitrile mixture is complete 0.074 part by weight of potassium persulfate dissolved in 3.13 parts by weight of demineralized water is added under continued stirring. The polymerization is continued for 80 minutes at 80° C. and the obtained latex of the graft copolymer B is cooled down to ambient temperature.

0.37 part by weight of a dispersion of a stabilizer (based on solids of the dispersion having a solids content of 60 wt %) is added to the obtained graft latex and the mixture is subsequently precipitated with 313 parts by weight of a magnesium sulfate solution having a solids content of 1.0 wt % at a temperature of from 80° C. to 95° C. After filtration of the graft copolymer the precipitate is washed twice with 550 parts by weight of demineralized water and dried at 70° C. to a residual moisture of less than 1 wt % in a drying cabinet.

The following table lists the graft substrate B1 and the agglomerating copolymer C used for producing the graft copolymer B:

| graft copolymer B | B-1 | B-2 | B-3 |
|---|---|---|---|
| example (inventive) | x | | |
| comparative example | | x | x |
| graft substrate | B1 | B1 | B1 |
| agglomerating copolymer C | C-1 | C-2 | C-3 |

Thermoplastic Copolymer A

SAN polymer: Random copolymer of styrene and acrylonitrile having a ratio of styrene to acrylonitrile of 75:25, a viscosity number of 64 ml/g (concentration 5 g/l in dimethylformamide measured at 20° C.) and a melt flow rate MVR of 64 [ml/10 min] measured at 220° C. with a load of 10 kg according to ISO 1133, produced by radical solution polymerization.

Added substances D

Silicone oil: Polydimethylsiloxane having a kinematic viscosity of 30 000 $mm^2/s$ Thermoplastic molding compounds composed of SAN polymer and graft copolymer B-1, B-2 or B-3

The SAN polymer and an abovementioned graft copolymer B-1, B-2 or B-3 are mixed in a twin-screw extruder having a shaft diameter of 25 mm. The temperature was set to 200° C. to 250° C. in the extrusion zone and processing was carried out with the twin-screw extruder set to 700 rpm. The batch size was 4 kg for all examples.

The ABS molding compounds were subjected to tests for determining flowability (MVR), Charpy notched impact strength, yellowness index (YI) and surface gloss. The test methods specified hereinabove were employed.

The test results are summarized in the following table. The compositions are reported in parts by weight.

| example | 1 | 2 | 3 |
|---|---|---|---|
| inventive example | x | | |
| comparative example | | x | x |
| graft copolymer B-1 | 34 | | |

-continued

| example | | 1 | 2 | 3 |
|---|---|---|---|---|
| graft copolymer B-2 | | | 34 | |
| graft copolymer B-3 | | | | 34 |
| SAN polymer | | 66 | 66 | 66 |
| silicone oil | | 0.05 | 0.05 | 0.05 |
| Charpy notched impact strength, 23° C. | [kJ/m$^2$] | 31.9 | 25.8 | 31.7 |
| MVR (220/10) | [ccm/10 min] | 11.4 | 12.1 | 12.8 |
| YI | | 19.4 | 19.2 | 19.8 |
| gloss, 20° | | 96.0 | 90.7 | 90.4 |

The data show that the inventive ABS molding compound according to example 1 has a very good notched impact strength and additionally also a markedly improved surface gloss.

The invention claimed is:

1. A process for producing a graft copolymer B constructed from:
    B1: 40 to 85 wt %, based on the solids content of the graft copolymer B, of a graft substrate (B1) obtained by (a) polymerizing:
        (B11): 0 to 10 wt %, based on the graft substrate B1, of at least one vinylaromatic, and
        (B12): 90 to 100 wt %, based on the graft substrate B1, of at least one diene,
        where (B11) and (B12) sum to 100 wt %;
    and (b) agglomerating the obtained graft substrate B1 by adding
    (C): 0.01 to 5 parts by weight, based on 100 parts by weight of the graft substrate B1, in each case based on the solids content, of an agglomerating copolymer (C) of:
        (C1): 80 to 99.9 wt % of one or more C$_1$ to C$_{12}$ alkyl methacrylates and
        (C2): 0.1 to 20 wt % of one or more comonomers selected from the group consisting of acrylamide and methacrylamide,
        where (C1) and (C2) sum to 100 wt %; and
    B2: 15 to 60 wt %, based on the solids content of the graft copolymer B, of a graft sheath obtained by reacting the agglomerated graft substrate B1 with a mixture of:
        (B21) 70 to 90 wt %, based on the graft sheath B2, of styrene and/or α-methylstyrene, and
        (B22) 10 to 30 wt %, based on the graft sheath B2, of acrylonitrile and/or methyl methacrylate,
    where the graft substrate B1 and the graft sheath B2 sum to 100 wt % in total; and
    where
    (i) the agglomerating copolymer (C) has a polydispersity U in the range of from 0.26 to 0.20 and a d$_{50}$ value in the range of from 115 to 140 nm; and
    (ii) the agglomerated graft substrate B1 has a bimodal particle size distribution of a fraction x) of nonagglomerated particles having a d$_{50}$ value in the range of from 80 to 120 nm and a fraction y) of agglomerated particles having a d$_{50}$ value in the range of from 350 to 450 nm and a polydispersity U in the range of from 0.27 to 0.20, and the process comprises:
        (a) polymerizing the monomers B12 and B11 in aqueous emulsion to afford a particulate graft substrate B1,
        (b) agglomerating the particulate graft substrate B1 which is in the form of an emulsion using an agglomerating copolymer (C), wherein the copolymer (C) has a polydispersity U in the range of from 0.26 to 0.20 and a d$_{50}$ value in the range of from 115 to 140 nm to afford an agglomerated particulate graft substrate B1, and subsequently
        (c) polymerizing the monomers B21 and B22 of the graft sheath in aqueous emulsion in the presence of the agglomerated particulate graft substrate B1.

2. The process according to claim 1, characterized in that the copolymer (C) is a copolymer of 92 to 98 wt %, based on the total solids in (C), of ethyl acrylate and 2 to 8 wt %, based on the total solids in (C), of methacrylamide having a polydispersity U in the range of from 0.26 to 0.20 and a d$_{50}$ value in the range of from 115 to 140 nm.

3. The process according to claim 1, characterized in that the graft copolymer B is constructed from:
    B1: 40 to 85 wt %, based on the solids content of the graft copolymer B, of a graft substrate (B1) obtained by (a) polymerizing:
        (B11): 0 to 10 wt %, based on the graft substrate B1, of styrene, and
        (B12): 90 to 100 wt %, based on the graft substrate B1, of butadiene,
        where (B11) and (B12) sum to 100 wt %;
    and (b) agglomerating the obtained graft substrate B1 by adding
    (C): 0.01 to 5 parts by weight, based on 100 parts by weight of the graft substrate B1, in each case based on the solids content, of an agglomerating copolymer (C) of:
        (C1): 80 to 99.9 wt % of ethyl acrylate and
        (C2): 0.1 to 20 wt % of methacrylamide,
        where (C1) and (C2) sum to 100 wt %; and
    B2: 15 to 60 wt %, based on the solids content of the graft copolymer B, of a graft sheath obtained by reacting the agglomerated graft substrate B1 with a mixture of:
        (B21) 70 to 90 wt %, based on the graft sheath B2, of styrene, and
        (B22) 10 to 30 wt %, based on the graft sheath B2, of acrylonitrile,
    where the graft substrate B1 and the graft sheath B2 sum to 100 wt % in total; and
    where
    (i) the agglomerating copolymer (C) has a polydispersity U in the range of from 0.26 to 0.20 and a d$_{50}$ value in the range of from 115 to 140 nm; and
    (ii) the agglomerated graft substrate B1 has a bimodal particle size distribution of a fraction x) of nonagglomerated particles having a d$_{50}$ value in the range of from 80 to 120 nm and a fraction y) of agglomerated particles having a d$_{50}$ value in the range of from 350 to 450 nm and a polydispersity U in the range of from 0.27 to 0.20.

4. The process according to claim 1, characterized in that the copolymer (C) has a polydispersity U in the range of from 0.25 to 0.21 and a d$_{50}$ value in the range of from 120 to 135 nm.

5. A graft copolymer B obtained by a process according to claim 1.

6. A thermoplastic molding compound comprising a thermoplastic copolymer A and a graft copolymer B according to claim 5 and optionally further components K, wherein the molding compound comprises:
    A: 40 to 80 wt % of at least one thermoplastic copolymer A obtained from:
        A1: 20 to 31 wt %, based on the copolymer A, of acrylonitrile, and A2: 69 to 80 wt %, based on the copolymer A, of styrene or α-methylstyrene or a mixture of styrene and α-methylstyrene, B: 20 to 60 wt % of the graft copolymer B; and K: 0 to 5 wt % of further components K, where the components A, B, and K sum to 100 wt %.

7. The thermoplastic molding compound according to claim 6 characterized in that the copolymer A is constructed from the monomers styrene and acrylonitrile.

8. The thermoplastic molding compound according to claim 6, characterized in that said compound additionally comprises at least one further thermoplastic polymer (TP) selected from the group consisting of polycarbonates, polyester carbonates, polyesters, and polyamides.

9. A method of processing a thermoplastic molding compound according to claim 6 for producing molded articles.

10. The process according to claim 1, characterized in that the copolymer (C) comprises a core constructed from at least one of the monomers cited as component (C1), wherein this core is grafted with a copolymer constructed from the components (C1) and (C2) by an emulsion polymerization comprising the steps of:
  (x) emulsion polymerizing at least one monomer (C1) in a first step, and
  (y) adding a monomer mixture comprising monomers (C1 +C2) in a further step;
    characterized in that the steps (x) and (y) are performed in the presence of at least one emulsifier which is employed in an amount of from 0.05 to 0.50 wt % in step (x),
    and in an amount of from 0.45 to 4.50 wt % in step (y), in each case based on the total monomer content of the copolymer (C) in the entire process.

* * * * *